April 17, 1934.   R. C. BENNER ET AL   1,955,574
METHOD OF OPERATING FUEL BURNING APPARATUS
Filed Nov. 29, 1929   2 Sheets-Sheet 2
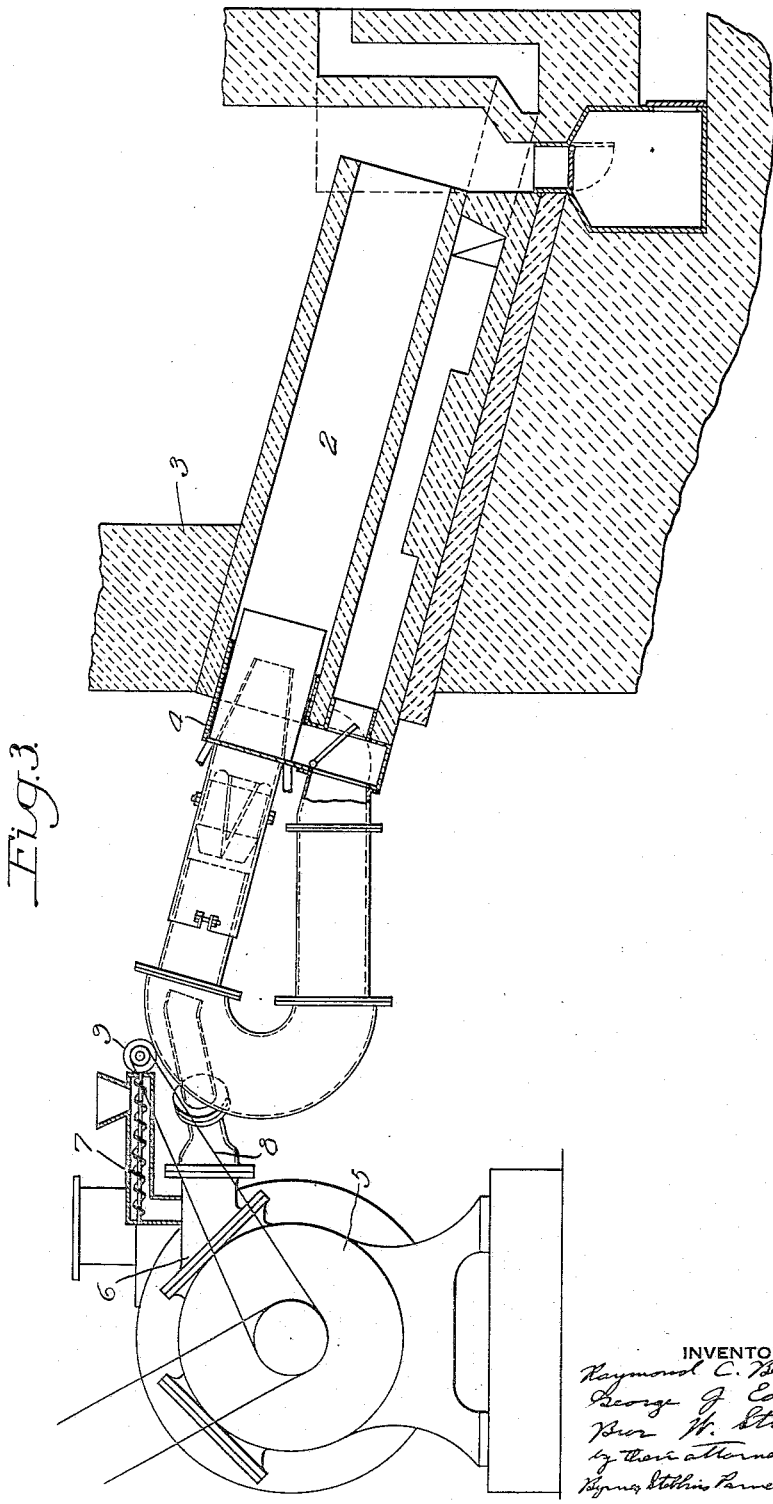

Patented Apr. 17, 1934

1,955,574

UNITED STATES PATENT OFFICE 1,955,574

METHOD OF OPERATING FUEL BURNING APPARATUS

Raymond C. Benner, George J. Easter, and Bror W. Stromberg, Niagara Falls, N. Y., assignors to The Carborundum Company, Niagara Falls, N. Y., a corporation of Pennsylvania Application November 29, 1929, Serial No. 410,537

10 Claims. (Cl. 110—28)

This application is a continuation-in-part of our copending application, U. S. Serial No. 295,498, filed July 26, 1928, for Fuel burning apparatus and method of operating the same.

The present application is not restricted to any particular type of furnace or combustion chamber. It deals primarily with methods of treating fuel in such a manner as to raise or lower the melting point of the ash according to the desired method of disposing of the slag. A principal object of our invention is the protecting of the walls of furnaces from fluid slag.

Reference is made to the accompanying drawings in which

Figure 1:
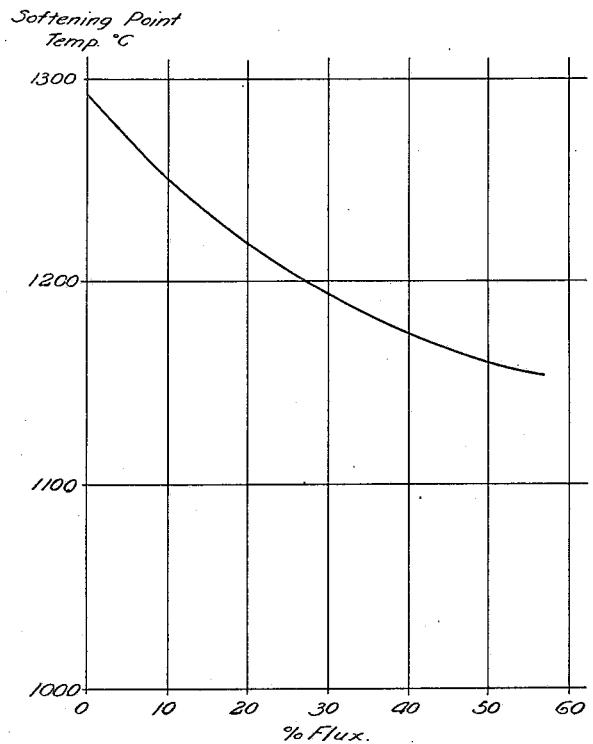
Figure 1 is a curve illustrating one principle of my invention.
Figure 2:
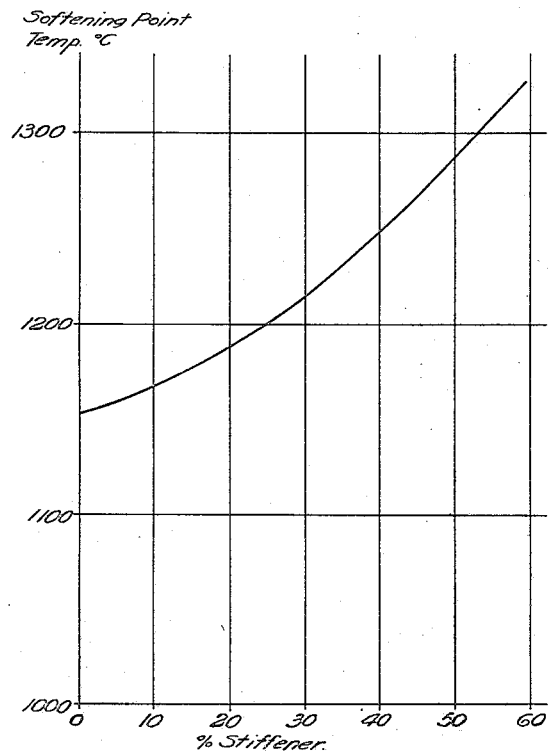
Figure 2 is a similar curve illustrating another phase thereof.

Figure 3, which is diagrammatic, discloses one form of apparatus for practicing our invention.

The fusibility of coal ash depends principally on (1) the ratio of the silica to the bases present, (2) the particular bases present, (3) the percentage of alumina present, and (4) on whether ferric or ferrous silicates are present in the ash. High percentages of silica and high percentages of alumina are in general associated with high softening points. High percentages of soda and potash give low softening points. High percentages of lime and magnesia have somewhat the same effect. The presence of iron oxide in the ash (which is very common originating from pyrite for example) has different effects according to the condition of the atmosphere of the combustion chamber and the amount of carbon in the ash. An oxidizing atmosphere tends to produce ferric oxides and resultant compounds with silica which have a high softening point. Strongly reducing conditions tend to produce metallic iron which has a high melting point. Under certain conditions iron in pyrites is likely to be converted into ferrous oxide which forms with silica easily fusible compounds. The presence of iron oxide in the coal is the chief cause of change in the melting point of the ash. It will be noted however that its effect depends on oxidizing or reducing conditions in the combustion chamber.

The following table is said to give the composition and softening temperatures for five coal ashes covering a wide range of fusibility.

| | Softening temperature, °F | Percentages of total ash forming contents | | | | | | | | |
|---|---|---|---|---|---|---|---|---|---|---|
| | | SiO₂ | Al₂O₃ | Fe₂O | TiO₂ | CaO | Mgo | Na₂O | K₂O | SO₃ |
| Montana subbituminous | 2060 | 30.7 | 19.6 | 18.9 | 1.1 | 11.3 | 3.7 | 1.9 | 0.5 | 12.2 |
| Illinois bituminous | 2320 | 46.2 | 22.9 | 7.7 | 1.0 | 10.3 | 1.6 | 0.7 | 0.8 | 8.9 |
| Pittsburgh bituminous | 2500 | 49.7 | 26.8 | 11.4 | 1.2 | 4.2 | 0.8 | 1.6 | 1.3 | 2.5 |
| West Virginia semibituminous | 2730 | 51.0 | 30.9 | 10.7 | 1.9 | 2.1 | 0.9 | 1.0 | 0.4 | 0.6 |
| Kentucky bituminous | 2900 | 58.5 | 30.6 | 4.2 | 1.8 | 2.0 | 0.4 | 0.7 | 0.9 | 0.9 |

In general therefore the softening point of a coal ash may be raised by the addition of sand or a non-ferruginous clay to the coal, while the softening point of the ash may be lowered by adding lime or soda to the coal.

The addition of various materials to ore in metallurgical operations for reducing the softening point of slag is known. We propose to change the softening point of the ash however in combustion furnaces where powdered coal, for example, is used, although our process is not necessarily limited to any particular type of coal furnace. On account of the very high rates of combustion obtainable with powdered coal furnaces (which may exceed 100,000 British thermal units per cubic foot of furnace volume per hour) the problem of disposal of the ash is very different from that in metallurgical operations, where the slag separates from the metal by gravity and is tapped off as a liquid from above the metal. In a powdered coal furnace the slag may also be taken off in finely divided solid form for which purpose it is desirable to raise the softening point of the ash. It may also be collected on the furnace walls to a certain thickness in congealed form after which the conduction through the furnace walls is reduced to such an extent that additional slag deposited on the furnace wall flows down it in a molten state.

In order to illustrate the function of the addition of a flux or a stiffener it may be assumed that curve No. 1 represents the softening point of a certain slag when a flux or a mixture of fluxes are added. The abscissæ represents the amount of flux expressed in percent of the amount of ash present in the fuel and the ordinate may represent the softening point of the mixture of slag and flux.

Curve No. 2 may be said to represent the case when a material is added which increases the softening temperature of the slag. The two curves do not represent any specific cases but are merely meant to illustrate the principle of the invention. It is obvious that if such curves are made up for a specific slag the softening point of the slag can be altered to specific point by the addition of a specific material, the amount of which may be determined by means of said curves.

The main difficulties arise therefore in the operation of combustion furnaces which do not arise in the case of metallurgical operations where the liquid slag separates from the liquid metal by gravity, viz:

1. If the temperature becomes too high the ash becomes extremely fluid, and due to its decomposition upon the refractories and its flowing in contact therewith, it reacts upon them chemically and washes them away, or penetrates them, as previously pointed out.

2. If the temperature within the combustion chamber is too low the ash is not liquid but is rather viscous and solid, and builds up in the combustion chamber in an objectionable manner, particularly when the combustion chamber is of small cross sectional area.

The operation of the furnace is satisfactory and minimum trouble is encountered when the melting point of the ash is such and the conduction of heat through the furnace walls is such that a layer of solid or very viscous slag builds out from the furnace wall a short distance only. Since the thermal conductivity of furnace walls constructed from silicon carbide brick may run higher than 0.002 caloris/cm²/sec/° C. or more than five times that of fire clay and since the thermal conductivity of the slag is considerably less than that of silicon carbide, it is possible to establish an equilibrium condition in which the silicon carbide bricks are protected with a thin coating of solid or very viscous slag. Further deposits of slag are not congealed but remain liquid and flow downward to the ash pit while separated from the refractories by the underlying layer of congealed ash. We have found that this desirable action occurs when the flame temperature is between approximately 50° C. and 350° C. above the softening point of the ash as determined by pyrometric cones.

The importance of the composition of the coal ash is especially great when boilers are run at high temperature up to several hundred percent of their normal rating. It is possible to do this with installations in which silicon carbide walls are used in connection with air or water cooling (or combined air and water cooling) if the melting point of the ash is adjusted to protect the furnace lining. We may define the melting point of the ash as the temperature at which it will run down the furnace walls at a rate which will prevent accumulation of slag on the furnace walls beyond a skin or coating which has been formed over the walls (which coating is produced by the air and/or water cooling of the furnace walls) and the congealing or setting of the slag in immediate contact therewith. The melting point is therefore somewhat higher than the softening point determined by pyrometric cones and depends somewhat on the change of viscosity with the temperature.

When the boiler installation is run at a rate several hundred percent above its normal rating, the rate of combustion reaches a very high value with corresponding increase of flame temperature. We have obtained as high a value as 350,000 British thermal units per cubic foot per hour. The corresponding flame temperature is about 1500° to 1550° C. as determined by an optical pyrometer but must be somewhat in excess of this value in the interior parts of the chamber where the combustion is most intense. In such cases it is desirable that the melting point of the ash should be about 1300° C. to 1350° C.

We have found that in an ordinary boiler furnace provided with walls of silicon carbide refractories a decrease of the melting point of the slag of 50° C. lowered the maximum rate of heat liberation which could be maintained in the furnace without injury to the furnace walls with about 5,000 British thermal units per cubic foot per hour when the total heat liberation amounted to about 40,000 British thermal units per cubic foot per hour.

With fire-clay bricks we have found in cases where the ash had a comparatively high percentage of iron that the bricks were eroded to the depth of two inches in 48 hours of operation. By our methods we are able to protect bricks having suitable thermal conductivity above that of fire clay with a thin coat of slag so that the furnace walls are maintained in uneroded condition for indefinite periods.

The effects of additions of given materials on the melting-point of a given coal ash can be experimentally determined and used as a basis for calculations which take into account the flame temperature and the desired melting point of the ash.

Our invention therefore is drawn to a method of controlling the softening point of the ash by adding to the coal various materials selected with a view to altering the softening point of the ash to make it bear a definite relation to the flame temperature in the furnace where it is being burned. The nature and amount of material to be added is varied according to the fuel used and the rate of combustion of the fuel.

According to our method of operation, a sample of the coal which it is desired to use, is taken and its ash content determined. This ash is then mixed in weighed proportions with a temporary binder (which leaves no appreciable amount of ash in the subsequent heating operation) and the mixtures are then heated and their softening points determined. The results secured from ashes from typical coals are recorded, and charts are made therefrom. By reference to such charts and the ash content of the coal, it is easily possible to calculate the amount of reagent which must be added to a known quantity of coal to give an ash mixture of any desired softening point after some experience with the effects of different reagents on a given coal.

As previously noted, the best conditions of furnace operation are those in which the temperature of the gases within the combustion chamber is from 50° C. to 350° C. above the softening point of pyrometric cones made from the ash in question. Accordingly we determine the temperature within the furnace when burning the coal in question at a known rate and then add to the coal a reagent selected to cause the ash to run freely down the wall at a temperature from 100 to 300° C. below the furnace temperature. When the rate of fuel feed to the burner is changed the temperature within the furnace is also changed by an amount which may be determined. When this change in temperature is effected the amount of, or the nature of the reagent, added to the coal is changed to correspond.

In this way we are enabled to operate such a furnace with powdered coal for fuel, selecting the cheapest coal for use and burning it at any desired rate, it being only necessary to have a knowledge of the characteristics of the ash content of the coal and the temperature at which the furnace is to be operated.

Where several reagents are available for giving the desired change in the melting point of the ash, one which costs the least for the desired result will ordinarily be selected for use, as illustrated in the following case.

One material which may be used is rouge, while another is fluxing or fusible clay. In selecting the reagent fluxing clay is cheaper than rouge on a tonnage basis, but four or five times more clay than rouge may be required so that rouge is more desirable because of the fact that less ash is produced and hence less heat is lost. However, the heat loss in ash is not severe in many types of furnaces. A number of factors have to be considered therefore in determining the most economical reagent, and our invention is not confined to the use of any specific materials for controlling the melting point of the ash, or to any definite quantity, but contemplates the use of any of a large number of reagents that may be used to modify the softening point of the ash whereby the character of the ash can be definitely controlled according to conditions in the combustion chamber and the temperature within the same.

The invention contemplates not only the use of a reagent to maintain the melting point of the ash at a substantially definite point below the flame temperature, but also the use of reagents to increase the melting point to a point above the flame temperature where it is desired to maintain and dispose of the ash as a powder or in an uncongealed state.

Another application of our invention is in connection with fuel burning furnaces where the ash from the fuel is removed from the furnace in a liquid state. If for example a boiler furnace is fired with a given coal at a given rating, the coal ash slag may have the right viscosity to be drained from the bottom of the furnace. If, however, the boiler rating is changed, the temperature inside the furnace as well as the temperature of the slag may change so that considerable difficulties are encountered due to a change in the viscosity of the coal ash slag. If the boiler rating is lowered, the flame temperature as well as the temperature of the slag may decrease to such an extent that the viscosity of the slag becomes excessive and it will be impossible to remove the slag in a liquid state. If this new condition is met with by the introduction of a sufficient amount of a fluxing agent, however, it may be possible to so lower the melting point of the slag that the slag can be drained from the furnace bottom as mentioned before.

In case the boiler rating is increased, it may prove that the addition of a stiffener may be useful. In general, it is desirable to keep the viscosity of the slag constant and independent of the furnace temperature. It is believed that the above mentioned application of our invention is especially important in case the walls of the furnace are water-cooled as such a furnace often is operated at ratings which may vary several hundred percent from one time to another, but our invention is by no means limited to furnaces with water-cooled walls or even boiler furnaces, but can be used in connection with any furnace burning ash containing fuel.

The drawings show, more or less diagrammatically, one form of apparatus for practicing our invention. In the drawings, 2 is a combustion chamber. This combustion chamber is shown as being a radiating combustion chamber having silicon carbide refractory walls, but the combustion chamber may be of any other desired shape or nature, and may comprise the combustion space of a boiler furnace. The combustion chamber 2 is in a furnace structure 3, and 4 is a turbulent burner for burning powdered coal. Powdered coal is supplied to the burner 4 by a blower 5 having a discharge passage 6 leading to the burner.

At 7 is a screw feed device for introducing the reagent directly into the fuel discharge passage 6, so that the reagent is mingled with the powdered coal. The feed device 7 is a proportional feeder. It may be independently driven, or may be driven with the blower through a belt 8 and speed reducing gear 9. It will be understood that this apparatus is merely illustrative of one embodiment for practicing our invention, and that the reagent may be otherwise supplied to the combustion chamber or to the powdered fuel.

As explained in our said copending application, the burner is of a turbulent type by means of which the character of the flame can be controlled and regulated so as to produce substantially uniform flame temperatures along the length of the combustion chamber. The combustion chamber itself is of a material such as silicon carbide having high thermal conductivity and a high factor of heat emissivity. The air duct under the combustion chamber is restricted, as indicated in the drawings, to give a greater velocity of flow at this point in the travel of the air, and since the cooling effect with a wall of high thermal conductivity increases with the increase in the velocity of the air, the restriction is located at a place where the radiating combustion chamber tends to become heated, thereby serving to maintain the wall of the radiating combustion chamber of substantially uniform temperature along its length.

Instead of adding the fluxing reagent to the coal in constant ratio in a given case, the reagent may be added at intervals to regulate the thickness of slag congealed on the furnace walls or base. Also the reagent may be injected continuously or intermittently into the combustion chamber separately from the fuel instead of being incorporated directly into the powdered coal.

We claim:

1. In the process of burning powdered coal, the step of introducing a reagent into the combustion chamber during the process of combustion for altering the melting point of the coal ash in variable quantities relatively to the fuel with variations in the flame temperature, whereby a substantially uniform temperature differential is maintained between the melting point of the ash and the flame temperature.

2. In the process of burning powdered coal, the steps which comprise introducing a reagent into the combustion chamber during the process of combustion for altering the melting point of the coal ash, and varying the effective amount of reagent with variations in the flame temperature to maintain a substantially uniform temperature differential between the melting point of the coal ash and the flame temperature.

3. In the process of burning powdered coal in a combustion chamber the walls of which are coated with ash from the powdered fuel, the steps which comprise introducing a reagent into the combustion chamber during the process of combustion, which reagent is capable of lowering the melting point of the coal ash and varying the effective quantities of the reagent with variations in the flame temperature to maintain the fusion point of the ash just sufficiently below the furnace temperature to permit ready removal of the ash in liquid form.

4. The method of controlling the thickness of adherent ash on a refractory wall of a combustion chamber in which powdered coal is used as a fuel, which comprises injecting a reagent into the combustion chamber during the process of combustion for varying the fluxing point of the ash, and controlling the injection of the reagent to increase the fluidity of the ash when it tends to become too thick and decrease the fluidity when it tends to become too thin.

5. The method of operating a furnace having a combustion chamber in which powdered coal is burned as a fuel the walls of which are maintained with a slag coating thereover, which method comprises the steps of raising the melting point of the slag during the process of combustion with a rise in the furnace temperature and decreasing the melting point of the slag with a fall in the flame temperature by the use of a suitable reagent in amounts varying according to the variation in temperature.

6. The method of controlling the thickness of a slag coating on the wall of a furnace in which powdered coal is being burned, which comprises injecting a reagent into the furnace capable of altering the fusion point of the slag and varying the effective quantity of reagent with variations in the flame temperature in such amounts as to keep the fusion point of the ash just sufficiently below the furnace temperature to permit its ready removal in liquid form under the varying conditions of temperature.

7. The method of controlling the thickness of slag coating on a furnace wall of a furnace in which powdered coal is being burned, which comprises feeding powdered fluxing material into the furnace during the process of combustion when the slag coating is thicker than desired, and decreasing the proportion of fluxing material to coal fed to the furnace when the slag becomes too thin.

8. In the method of operating a furnace in which powdered coal is used as fuel, the steps which comprise the determination of the temperature within the combustion space of the furnace at a given rate of combustion, introducing a reagent into the combustion space of the furnace capable of changing the melting point of the ash in such quantities as to establish a substantially predetermined differential between the furnace temperature and the temperature at which the ash melts, and increasing or decreasing the amount of reagent in such quantities as to maintain substantially the same differential when the temperature at which the furnace is operating is varied.

9. In the method of burning fuel, the steps which comprise determination of the temperature within the combustion chamber at a given moment, introducing a reagent into the combustion chamber with the fuel during the process of combustion in such proportion that a substantially predetermined differential will exist between the temperature within the chamber and the melting temperature of coal ash, and increasing or decreasing the reagent with variations in the furnace temperature so as to maintain the said temperature differential.

10. The steps in the method of burning powdered coal in a combustion chamber, the walls of which are coated with ash from the powdered fuel, which comprises adding a reagent to the coal to alter the melting point of the resulting ash to a temperature lower than the temperature of the combustion chamber in which the fuel is being burned, and varying the quantity of reagent during the process of combustion with variations in combustion temperature so as to preserve a constant predetermined temperature relationship between the melting point of the ash and the temperature of the combustion chamber.

RAYMOND C. BENNER.
GEORGE J. EASTER.
BROR W. STROMBERG.